United States Patent
RoyChowdhury et al.

(10) Patent No.: US 11,810,364 B2
(45) Date of Patent: Nov. 7, 2023

(54) AUTOMATED ROAD DAMAGE DETECTION

(71) Applicant: Volvo Car Corporation, Gothenburg (SE)

(72) Inventors: Sohini RoyChowdhury, Santa Clara, CA (US); Leela Srikar Muppirisetty, Alvängen (SE); Roman Aleksandrovich Akulshin, Sunnyvale, CA (US)

(73) Assignee: Volvo Car Corporation, Gothenburg (SE)

( * ) Notice: Subject to any disclaimer, the term of this patent is extended or adjusted under 35 U.S.C. 154(b) by 300 days.

(21) Appl. No.: 16/989,743

(22) Filed: Aug. 10, 2020

(65) Prior Publication Data
US 2022/0044034 A1 Feb. 10, 2022

(51) Int. Cl.
*G06K 9/00* (2022.01)
*G01N 21/88* (2006.01)
(Continued)

(52) U.S. Cl.
CPC ......... *G06V 20/58* (2022.01); *B60G 17/0165* (2013.01); *B60W 30/02* (2013.01);
(Continued)

(58) Field of Classification Search
CPC ......... G06V 20/58; G06T 7/11; G01S 17/931; G01C 21/3822; B60G 17/0165;
(Continued)

(56) References Cited

U.S. PATENT DOCUMENTS 10,486,485 B1 11/2019 Levinson et al.
11,584,377 B2 * 2/2023 Cox ................ B62D 15/025
(Continued)

FOREIGN PATENT DOCUMENTS

DE 102018001860 A1 9/2018
WO WO-2019134110 A1 * 7/2019

OTHER PUBLICATIONS

Wu et al., Road pothole extraction and safety evaluation by integration of point cloud and images derived from mobile mapping sensors, Mar. 15, 2019, Advanced Engineering Informatics, pp. 1-11 (Year: 2019).*

(Continued)

*Primary Examiner* — Peter D Nolan
*Assistant Examiner* — Demetra R Smith-Stewart
(74) *Attorney, Agent, or Firm* — Shumaker & Sieffert, P.A.

(57) ABSTRACT

A vehicle safety system and technique are described. In one example, a vehicle safety system communicably coupled to a vehicle, comprises processing circuitry coupled to a camera unit and a LiDAR sensor, the processing circuitry to execute logic operative to analyze an image captured by one or more cameras to identify predicted regions of road damage, correlate LiDAR sensor data with the predicted regions of road damage, analyze the LiDAR sensor data correlated with the predicted regions of road damage to identify regions of road damage in three-dimensional space; and output one or more indications of the identified regions of road damage, wherein the processing circuitry is coupled to an interface to the vehicle, the processing circuitry to output an identification of road damage.

20 Claims, 9 Drawing Sheets

(51) Int. Cl.

| | |
|---|---|
| *B60W 40/06* | (2012.01) |
| *B60W 30/18* | (2012.01) |
| *B60W 50/14* | (2020.01) |
| *B60W 30/02* | (2012.01) |
| *G01C 21/00* | (2006.01) |
| *G06T 7/11* | (2017.01) |
| *G06V 20/58* | (2022.01) |
| *G01S 17/931* | (2020.01) |
| *B60G 17/0165* | (2006.01) |
| *E01C 23/01* | (2006.01) |
| *G06N 3/02* | (2006.01) |
| *G06F 18/2415* | (2023.01) |

(52) U.S. Cl.
CPC ...... *B60W 30/18163* (2013.01); *B60W 40/06* (2013.01); *B60W 50/14* (2013.01); *E01C 23/01* (2013.01); *G01C 21/3822* (2020.08); *G01N 21/8806* (2013.01); *G01S 17/931* (2020.01); *G06F 18/24155* (2023.01); *G06N 3/02* (2013.01); *G06T 7/11* (2017.01); *B60G 2800/162* (2013.01); *B60W 2050/146* (2013.01); *B60W 2420/42* (2013.01); *B60W 2420/52* (2013.01); *B60W 2552/00* (2020.02); *G06T 2207/10028* (2013.01); *G06T 2207/20076* (2013.01); *G06T 2207/20081* (2013.01); *G06T 2207/20084* (2013.01); *G06T 2207/30261* (2013.01)

(58) Field of Classification Search
CPC ........... B60W 30/02; B60W 30/18163; B60W 40/06; B60W 50/14; E01C 23/01; G01N 21/8806; G06K 9/6278; G06N 3/02
See application file for complete search history.

(56) References Cited

U.S. PATENT DOCUMENTS

| | | | | |
|---|---|---|---|---|
| 2018/0164119 | A1* | 6/2018 | Becker | B60W 60/001 |
| 2019/0001965 | A1 | 1/2019 | Cho et al. | |
| 2019/0025853 | A1 | 1/2019 | Julian et al. | |
| 2020/0023797 | A1 | 1/2020 | Volos et al. | |
| 2020/0073405 | A1 | 3/2020 | Xu et al. | |
| 2020/0074266 | A1* | 3/2020 | Peake | G05D 1/0231 |
| 2020/0250984 | A1 | 8/2020 | Kundu et al. | |
| 2021/0108926 | A1* | 4/2021 | Tran | G06T 17/05 |
| 2021/0287040 | A1* | 9/2021 | Al-Qunaieer | G06V 10/25 |
| 2022/0024485 | A1* | 1/2022 | Theverapperuma | G06K 9/6257 |

OTHER PUBLICATIONS

Koch et al., "Pothole detection in asphalt pavement images." Advanced Engineering Informatics, Accepted Manuscript, Aug. 2011, 36 pp.

Mednis et al., "Real Time Pothole Detection Using Android Smartphones with Accelerometers," IEEE Xplore, 2011 International Conference on Distributed Computing in Sensor Systems and Workshops (DCOSS), Jun. 2011, 7 pp.

Endler et al., "ContextNet: Context Reasoning and Sharing Middleware for Large-scale Pervasive Collaboration and Social Networking," Middleware Posters'2011, Proceedings of the Workshop on Posters and Demos Track, ACM, Dec. 12, 2011, 2 pp.

Hackel et al., "Fast Semantic Segmentation of 3D Point Clouds With Strongly Varying Density," ISPRS Annals of the Photogrammetry, Remote Sensing and Spatial Information Sciences, vol. 3(3) XXIII ISPRS Congress, Jul. 12-19, 2016, pp. 177-184.

Poudel et al., "Fast-SCNN: Fast Semantic Segmentation Network." arXiv preprint arXiv:1902.04502, Feb. 12, 2019, 9 pp.

Chen et al., "Inexpensive Multimodal Sensor Fusion System for Autonomous Data Acquisition of Road Surface Conditions", IEEE Sensors Journal, IEEE, USA, vol. 16, No. 21, Nov. 2016, pp. 7731-7743, XP011624254, ISSN: 1530-437X, DOI: 10.1109/JSEN/2016.2602871.

Extended Search Report from counterpart European Application No. 21190568.2 dated Jan. 4, 2022, 13 pp.

Guo et al., "Is It Safe to Drive? An Overview of Factors, Metrics, and Datasets for Driveability Assessment in Autonomous Driving", IEEE Transactions on Intelligent Transportation Systems, IEEE, Piscataway, NJ, USA, vol. 21, No. 8, Jul. 12, 2019, pp. 3135-3151, XP011801454, ISSN: 1524-9050, DOI: 10.1109/TITS.2019.2926042.

Kang et al., "Pothole Detection Sytem using 2D LiDAR and Camera", 2017 Ninth International Conference on Ubiquitous and Future Networks (ICUFN), IEEE, Jul. 4, 2017, pp. 744-746, ZP033130427, DOI: 10.1109/ICUFN.2017.7993890.

Lun et al., "A Survey of Applications and Human Motion Recognition with Microsoft Kinect", International Journal of Pattern Recognition and Artificial Intelligence (IJPRAI), vol. 29, No. 05, Jul. 9, 2015, 50 pp, XP055794102, SI, ISSN 0218-0014, DOI: 10.1142/S0218001415550083.

Ouma et al., "On the Use of Low-Cost RGB-D Sensors for Autonomous Pothole Detection with Spatial Fuzzy c-Means Segmentation", Geographic Information Systems in Geospatial Intelligence, Nov. 11, 2019, IntechOpen, XP055870179, ISBN: 978-1-83880-505-0, pp. 1-30, DOI: 10.5772/intechopen.84925, Retrieved from the Internet: URL: https://api.intechopen.com/chapter/pdf-preview/68823.

Srinidhi et al., "Pothole Detection using CNN and AlexNet", SSRN Electric Journal, Jul. 14, 2020, pp. 1-9, XP055870151, DOI: 10.2139.ssrn.3648822.

Ukhwah et al., "Asphalt Pavement Pothole Detection using Deep Learning Method Based on YOLO Neural Network", 2019 International Seminar on Intelligent Technology and Its Applications (ISITIA), IEEE, Aug. 28, 2019, pp. 35-40, XP033683714, DOI: 10.1109/ISITIA.2019.8937176.

Response to Extended Search Report dated Jan. 4, 2022, from counterpart European Application No. 21190568.2 filed Aug. 8, 2022, 16 pp.

\* cited by examiner

AUTOMATED ROAD DAMAGE DETECTION

TECHNICAL FIELD

The disclosure relates to image and point cloud processing systems and techniques.

BACKGROUND

Image processing generally refers to technology that analyzes and/or processes two or three dimensional image data in accordance with some technique. Often, a camera device or a similar technology captures a scene in image data or video data comprised of a serialized image data. Some technologies (e.g., computer vision) can be used to identify objects in images and at least for this reason, image processing technologies have been applied in a variety of technical solutions to identify objects of interest and actions of interest in image/video. One example application is in vehicular safety systems, for example, detecting obstructions behind a car while driving the car in reverse.

Vehicles, even by ordinary use, degrade substantially from the effects from road damage. Existing safety solutions, especially those applying image processing techniques, may mitigate these effects but have a number of shortcomings. Image based detection of road hazards in general is difficult, time consuming, and not always accurate.

SUMMARY

In general, the disclosure describes vehicle safety systems that employ automated road damage detection techniques combining image processing and point cloud processing technologies with machine learning constructs (e.g., neural networks). Some techniques of the disclosure include training a machine learning construct using a comparatively small set of manually annotated images. Once training is completed, the machine learning construct may be deployed in a vehicle safety system that captures images and point clouds of a road and detects instances of road damage with sufficient time to warn a driver and/or control a vehicle to avoid the road damage and/or mitigate effects from handling the road damage.

The vehicle safety system may use different types of formatted data to provide the machine learning construct as raw data from which relevant features are extracted and analyzed to determine if road damage is present in the formatted data. In one example, the vehicle safety system of this disclosure may access two-dimensional data and three-dimensional data provided by a camera (e.g., a two-dimensional image) and LiDAR equipment (e.g., a three-dimensional point cloud), respectively, and then, combine these data sets in a manner that allows for efficient image processing/machine learning, especially with respect to resource consumption and time. To illustrate by way of example, the machine learning construct for the vehicle safety systems may employ an architecture with a first machine learning model and a second machine learning model where the first model identifies two-dimensional regions of interest from two-dimensional camera images allowing the second model to focus on corresponding three-dimensional LiDAR point clouds to determine whether the regions of interest include road damage. Using this architecture, the vehicle safety systems do not waste resources and time analyzing three-dimensional LiDAR point clouds in their entirety; the vast majority of data in a point cloud most likely does not include any road damage.

The vehicle safety systems described herein are an enhancement over other solutions to vehicle safety issues. Current vehicle safety systems are limited in several respects and cannot reach the efficiency of the vehicle safety systems described herein. Some systems build machine learning models on either two-dimensional data or three-dimensional data but each trained model is inaccurate, inefficient, or both inaccurate and inefficient. By quickly identifying potential regions of damage with 2d image and then, analyzing an overlaid point cloud on these potential regions, the above-mentioned architecture of the first model and the second model provides quicker and more accurate determinations relative to only using 2d images or only using 3d point clouds. Current safety systems often rely upon high quality annotated camera images to train a machine learning model but obtaining such training images may be costly and/or mechanically unfeasible given a vehicle's construction. Current safety systems often rely on vehicle suspension system to detect road un-evenness underneath the tires but the vehicle suspension system cannot dampen the effect. Current systems do not utilize a variety of formatted data sets in the image processing technology. As mentioned above, some vehicle safety systems use camera data and LiDAR while others may use data sets in various formats. In another respect, current vehicle safety systems do not use complicated structures for machine learning constructs for a variety of reasons; as one reason, when the data is three-dimensional (e.g., LiDAR data), applying the machine learning model to this data consumes a significant amount of processor cycles and requires a substantial amount of time. In some instances, current vehicle safety systems cannot warn the driver with sufficient time to avoid the road damage due to any number of causes including not having enough processing power for the task, being limited in range, and/or the like. Current vehicle safety systems restrict applications of machine learning to conserve resources and/or to provide results within allotted time. A loss in accuracy and a rise in false positives/false negatives becomes apparent when following these restrictions. Hence, the vehicle systems and techniques described herein represent a practical application of a technological improvement/solution.

In one example, a method of detecting road damage includes analyzing an image captured by one or more cameras to identify predicted regions of road damage; correlating point cloud data from at least one LiDAR sensor with the predicted regions of road damage; analyzing the point cloud data from the at least one LiDAR sensor data correlated with the predicted regions of road damage to identify regions of road damage in three-dimensional space; and outputting one or more indications of the identified regions of road damage.

In another example, a vehicle safety system for detecting road damage is communicably coupled to a vehicle and comprises processing circuitry coupled to a camera unit and a LiDAR sensor, wherein the processing circuitry is to execute logic operative to analyze an image captured by one or more cameras to identify predicted regions of road damage, correlate LiDAR sensor data with the predicted regions of road damage, analyze the LiDAR sensor data correlated with the predicted regions of road damage to identify regions of road damage in three-dimensional space, and output one or more indications of the identified regions of road damage, wherein the processing circuitry is coupled to an interface to the vehicle, the processing circuitry to output an identification of road damage.

In another example, a computer-readable storage medium comprising processor-executable instructions that, when executed, cause a device to perform: analyzing an image captured by one or more cameras to identify predicted regions of road damage; correlating point cloud data from at least one LiDAR sensor with the predicted regions of road damage; analyzing the point cloud data correlated with the predicted regions of road damage to identify regions of road damage in three-dimensional space; and outputting one or more indications of the identified regions of road damage.

The details of one or more examples are set forth in the accompanying drawings and the description below. Other features, objects, and advantages will be apparent from the description and drawings, and from the claims.

DETAILED DESCRIPTION

Figure 1A:
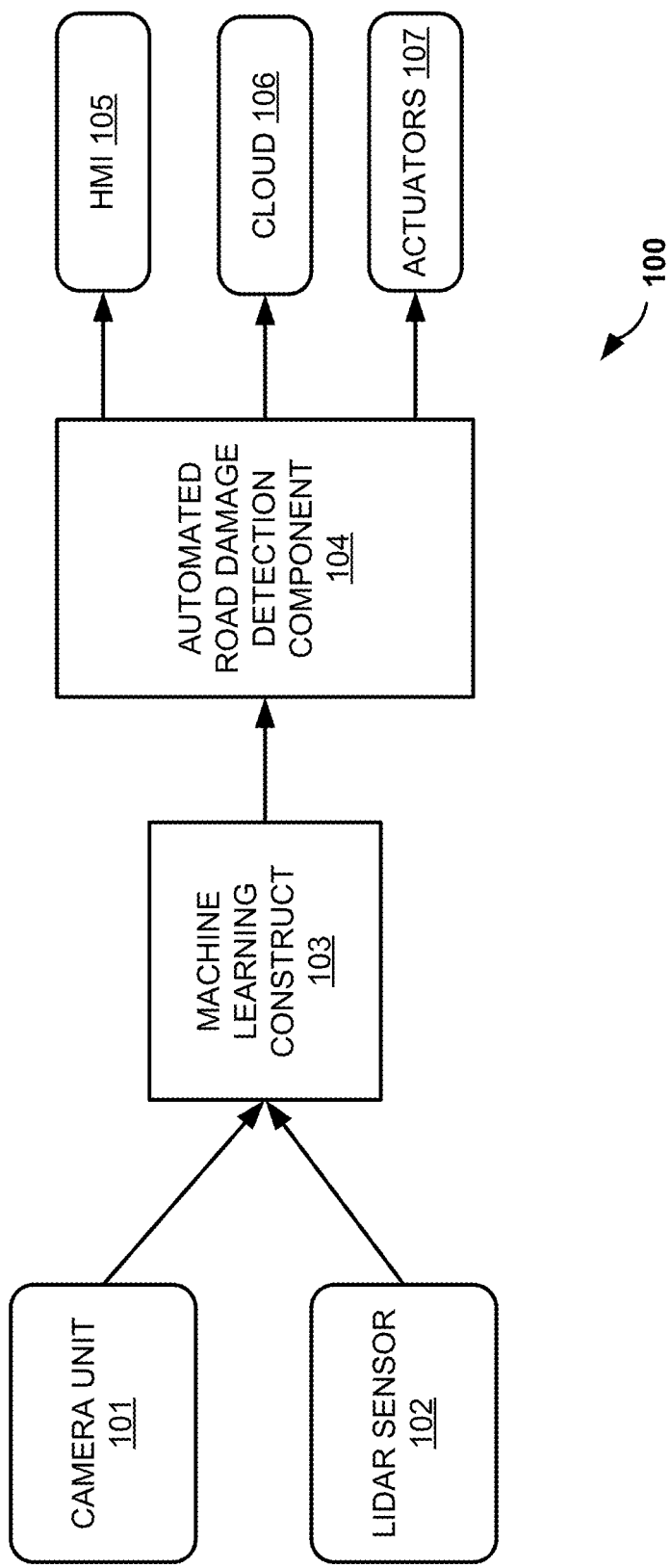
FIG. 1A is a structural block diagram and FIG. 1B is a functional block diagram illustrating an example system for automated road damage detection, in accordance with the examples described in this disclosure.

The disclosure relates to automated road damage detection by a vehicle safety system operating in real-time to prevent vehicle damage and/or injury to vehicle passengers. By implementing techniques described herein for automated road damage detection, the vehicle safety system is capable of detecting potholes and other classifications of road damage on a vehicle's path with sufficient time for mitigating and/or avoiding upcoming road damage. The vehicle safety system uses a camera directed away from the vehicle and a LiDAR or other sensor to detect the upcoming road damage, such as potholes, cracks and alligator cracks that can contribute to vehicle damage. The camera may be configured to capture two-dimensional images, while the LiDAR or other type of sensor may be configured to capture three-dimensional point clouds in the same field of views as the two-dimensional image. The vehicle safety system may warn others (e.g., transportation authorities) of the location and extent of the upcoming road damage.

The vehicle safety system described herein may be installed into a vehicle and connected to a network service. By identifying locations of road damage, the vehicle safety system may populate the network service with information (e.g., location information) associated with the upcoming road damage. Using this information, the vehicle safety system alerts the vehicle's driver and/or nearby vehicle drivers connected to the network service. In other examples, the vehicle safety system may assume control over one or more systems of the vehicle to mitigate the damaging effects from road damage or avoid the locations of road damage altogether. One example road damage mitigation technique invokes a dampening effect by a suspension system. Another example technique for mitigating the upcoming road damage involves reducing a current speed. One example technique instructs a control system to change lanes and avoid the upcoming road damage.

This vehicle safety system accomplishes such real-time detection using a machine learning construct that includes two machine learning models (e.g., deep-learning structures such as Convolutional neural networks or feature-based classifiers such as Bayesian classifiers): 1) A first model to process images and output an intermediate image with identified regions of possible road damage; and 2) A second model to classify each identified region, which has been overlaid with 3D point cloud data, as either a type of road damage or no road damage. Even though each model accepts, as input, 2D camera images and 3D point clouds, projecting the 3D data onto the 2D image results in reduction of a total processing time for the vehicle safety system. By focusing the second model on only a portion of the 3D point clouds (e.g., those portions associated with identified regions of potential damage by the first model), the vehicle safety system avoids processing regions without road damage, further reducing the total processing time.

In some examples, the vehicle safety system uses a 2-network architecture to generate the ground truth for accurate automated road damage detection. This two-network architecture can be trained using a small subset of annotated 2D images of road damage and the associated LiDAR cloud points. This two-network architecture relies on correlated data sets from the front camera and LiDAR to accurately detect road damage with a varying range, for example, fifty (50) meters away from the vehicle. A first network is applied to the 2D camera image data sets for generating a segmented map where predicted regions of road damage are identified and segmented. These predicted regions are correlated with LiDAR cloud points. A second network to confirm or reject the predicted regions is applied to only these correlated data sets, reducing an overall performance time. If any of the predicted regions correspond to actual instances of road damage, the second network is further applied to classify the upcoming road damage, for example, as potholes, cracks, alligator cracks, etc.

Figure 1B:
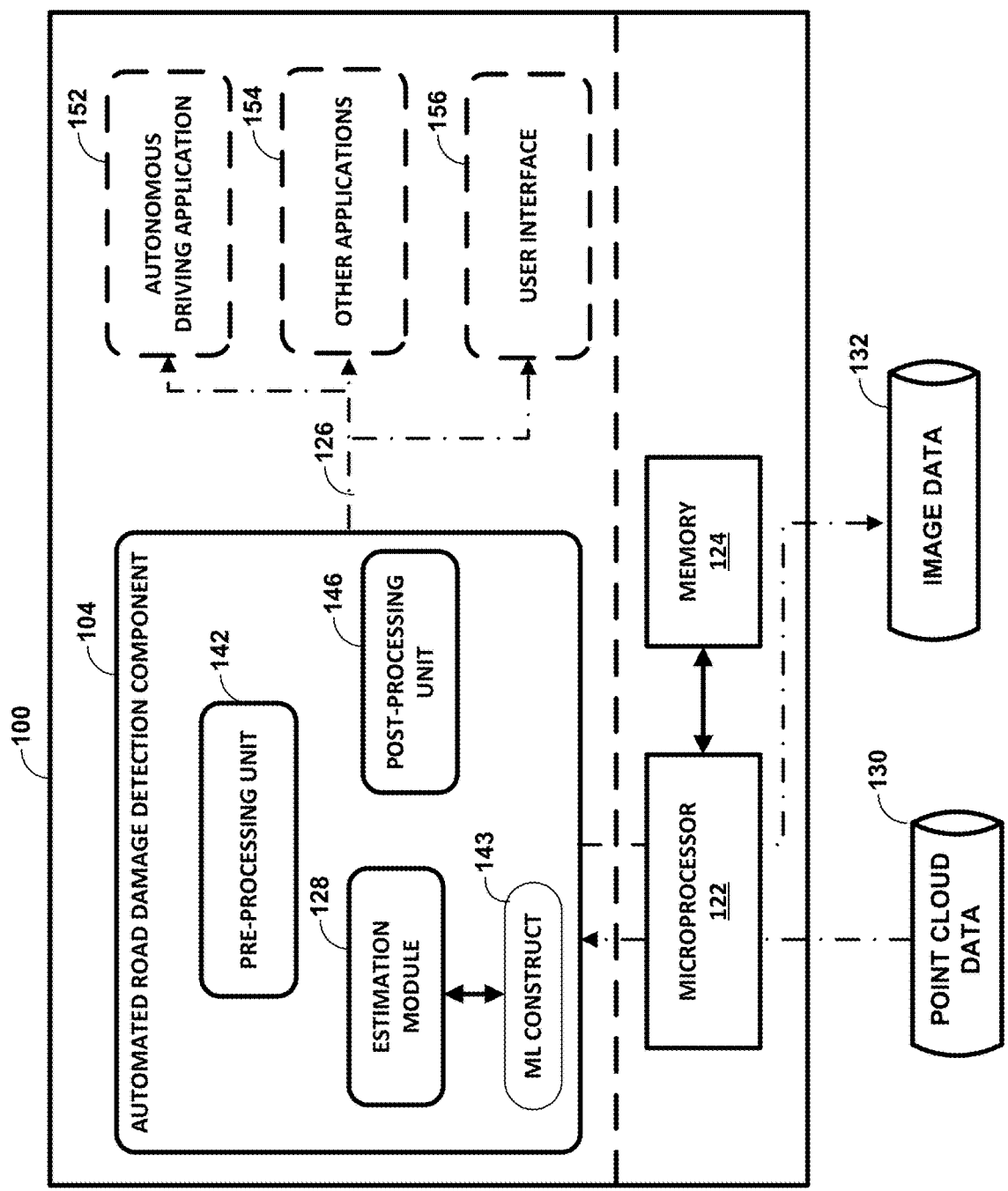

FIG. 1A is a functional block diagram and FIG. 1B is a structural block diagram illustrating an example system 100 for automated road damage detection, in accordance with the examples described in this disclosure. In some examples, example system 100 implements an image processing system and technique configured to identify instances of road damage in data sets that are provided by at least two data sources, such as camera unit 101 and LiDAR sensor 102, and representative of a view of transportation infrastructure (e.g., road) being traversed. In one example, camera unit 101 and LiDAR sensor 102 generate (two-dimensional) image data and (three-dimensional) point cloud data, respectively, and example system 100 applies machine learning construct 103 to both data sets to predict and (possibly) identify regions of road damage.

Camera unit 101 in general refers to a configuration of one or more cameras. Camera unit 101 may generate front-camera or back-camera images in pixel format where each pixel represents an area in two-dimensional space and stores at least three data points (i.e., an n-tuple) defining that pixel area's representation. An image in pixel format is an aligned arrangement of pixels. In an example area, an example pixel stores color data in the form of tuples of Red-Green-Blue (RGB) data, Yellow-Cyan-Magenta-Key (CMYK) data where key (K) may be Black, Cyan-Magenta-Yellow (CMY) data, Hue-Saturation-Lightness (HSL) data, Hue-Saturation-Value (HSV) data, Hue-Chroma-Luminance (HCL) data, or Lightness-A-B (LAB) or CIELAB data and/or the like. Another example pixel stores color data and additional data, such as luminance data, depth data, and/or the like. The present disclosure describes camera unit 101 as inclusive of any available imaging technology and capable of providing imaging data of any format; camera unit 101 is not limited to any particular camera device. The images described herein may alternatively be referred to as "image data" or "image data sets" in the present disclosure.

LiDAR sensor 102 includes any available sensing technology and is capable of providing three-dimensional data in any format including point clouds—which may alternatively be referred to as "point cloud data" or "point cloud data sets" in the present disclosure. LiDAR sensor 102 may produce LiDAR sensor data including point cloud data in the format of (x,y,z,r) where x,y,z are 3-d coordinates and r is reflectivity (the intensity of the reflected laser light). LiDAR sensor 102 may generate point clouds to represent a region in three-dimensional space where each three-dimensional data cube (e.g., voxel) maps to a two-dimensional area in a camera image of the above-mentioned image data. As described herein, points of the point clouds form contours of an object or a feature of interest, and example system 100 may correlate those points of the point cloud data with the image data; for example, this correlation may be accomplished as a projection of the point cloud data to a specific region of the image data. Instead of processing all the point clouds, example system processes (e.g., correlates) only the portion that maps to the specific region of the image data, reducing overall resource consumption (e.g., fewer processor cycles/capacities, fewer memory blocks/storage units, etc.) and resource requirements (e.g., less processing power, less memory/storage space, etc.). With a reduced resource footprint, the vehicle safety system described herein may improve overall performance time such that road damage is identified with sufficient time to alert the driver (and possibly other vehicle drivers) and/or control the vehicle to avoid or mitigate the upcoming road damage.

Camera unit 101 generates camera unit data comprising the images (i.e., image data or image data sets) and LiDAR sensor 102 generates LiDAR sensor data comprising the point clouds (i.e., point cloud data or point cloud data sets), both of which are feed (as input) into machine learning construct 103 where application of machine learning models (MLMs) results in one or more identified regions of road damage. One example MLM may be a deep-learning structure such as a deep fully connected neural network, a deep belief network, a recurrent neural network (RNN), or a convolution neural network (CNN). An example deep-learning structure includes a parameterized mathematical function (e.g., a polynomial). An alternative MLM may be a feature-based classifier such as a Bayesian classifier, support vector machines, or another probabilistic model. An example feature-based classifier includes a probability distribution. In one example, machine learning construct 103 combines a first MLM and a second MLM according to a machine learning architecture in which the first MLM processes the image data by identifying at least one predicted region of road damage and the second MLM processes the point cloud data such as by correlating a corresponding portion of the point cloud data with the at least one identified predicted region in the image data and determining whether the at least one identified predicted region in three-dimensional space includes actual road damage. The second MLM either rejects the at least one identified predicted region as road damage or classifies the at least one identified predicted region according to a matching road damage classification. One or both of the first and second MLMs are trained using a number of manually annotated images having annotated regions of road damage. The number of manually annotated images may depend upon a variety of factors of which one is a desired precision rate for the first MLM.

In one example, machine learning construct 103 includes a first convolution neural network (CNN) and a second convolution neural network (CNN) combined into a two-network infrastructure. In some examples, the first CNN is configured with a deep learning structure such as an encoder-decoder model. In some examples, machine learning construct 103 leverages the encoder-decoder model for semantic segmentation. To illustrate semantic segmentation by way of example, the encoder processes input image data comprising two-dimensional image datasets, produces N two-dimensional feature maps, and aggregates feature data between multiple maps to observe additional truths in the N two-dimensional feature maps and the decoder processes the N two-dimensional feature maps, produces a semantic segmented map and interpret aggregated features as one or more predicted regions of road damage. In the semantic segmented map (or simply segmented map), the one or more predicted regions of road damage are segmented and identified. The second CNN includes a deep-learning structure that is shallower than the first CNN.

Automated road damage detection component 104, in general, includes software code that when executed, causes vehicle safety system 100 to perform an action. Automated road damage detection component 104, implementing some of the techniques described herein, applies the first CNN to the image datasets to generate the segmented map and correlates the one or more predicted regions of road damage on the segmented map with three-dimensional points on the three-dimensional point cloud datasets (e.g., LiDAR sensor 102 (point cloud) data) to produce correlated three-dimensional point cloud datasets (or simply correlated point cloud data).

In the correlated three-dimensional point cloud datasets (e.g., from at least one LiDAR sensor 102), an example annotation identifies a three-dimensional volume as depicting a predicted region of road damage. To determine whether the identified predicted regions in three-dimensional space corresponds to at least one road damage classification, automated road damage detection component 104 analyzes correlated point cloud data corresponding to the identified predicted regions of road damage by applying the second CNN to that correlated point cloud data and identifying actual regions of road damage in the three-dimensional space. In some examples, the second CNN processes feature data from the correlated point cloud data. In some examples, the feature data comprises a mean and a standard deviation of points in the point cloud data. In some examples, automated road damage detection component 104 classifies the identified regions as one of a number of road damage classifications, such as a pothole, an obstruction, cracks and alligator cracks, and/or the like. In some examples, automated road damage detection component 104 stores point cloud data for the identified regions of road damage, a location and a reflective index for each reflective point in the three-dimensional space. Automated road damage detection component 104 may annotate the identified regions of road damage in the three-dimensional space with additional information in form of one or more attributes such as the road damage classification for each identified region. Another example attribute includes a depth range for an identified region of actual road damage such as near range, middle range, or far range.

Automated road damage detection component 104 may be configured to classify each instance of road damage as a road damage classification, such as a pothole, an obstruction, and/or the like. Automated road damage detection component 104 may include an automated vehicle control system, for example, configured to operate the vehicle's mechanical instruments and controls when in an autonomous driving mode. Automated road damage detection component 104 may instruct the vehicle control system to cause a vehicle to change lanes, reduce speed, or both change lanes and reduce speed.

In some examples, execution of automated road damage detection component 104 causes Human-Machine Interface (HMI) 105, cloud 106, and/or actuators 107 to perform some action. In one example, HMI 105 refers to user interface or dashboard that connects a person (e.g., a driver or passenger) to vehicle safety system 100 and/or another system in the vehicle. HMI 105 may enable human-machine interactions between the driver and an automated vehicle control system, for example, by directing that system to commence autonomous driving mode. HMI 105 may enable human-machine interactions between the driver and vehicle safety system 100, for example, in warnings manifested through textual means (e.g., alert notifications), visual means (e.g., flashing colors and "danger" signs), and/or auditory means (e.g., beeps, sirens, etc.). These warnings may inform the driver as to upcoming road damage if the vehicle remains on a current path. These warnings should provide enough time for the driver to avoid the upcoming road damage or at least mitigate negative effects from engaging the upcoming road damage.

In one example, cloud 106 refers to a cloud-based network (e.g., a service provider network) that provides data and/or computing services. Automated road damage detection component 104 may connect to the cloud-based network to store various data and (possibly) off-load data processing tasks. In some examples, automated road damage detection component 104 stores point cloud data for the identified regions of road damage and a location and a reflective index for each reflective point in each identified region in the three-dimensional space. In some examples, cloud 106 connects to a vehicle safety network operative to push notifications to subscriber vehicles currently in motion. Crowdsourcing feeds the vehicle safety network with information on unreported/new instances of road damage and, in turn, the vehicle safety network generates and pushes warning notifications to subscriber vehicles that are within a vicinity. The information may be used to populate map data (e.g., geographic maps) with locations of unreported/new instances of road damage and their corresponding road damage classifications. If a first subscriber vehicle encounters a pothole and communicates that pothole's location information to cloud 106, a second subscriber vehicle driving on a same road and heading in same direction receives a warning notification for display on HMI 105.

In general, actuators 107 are mechanical units that operate a vehicle mechanism or device. Actuators 107 require a control signal and an energy source to provide an adjustable flow of energy for conversion into mechanical motion. Actuators 107 are responsible for moving and controlling the vehicle, for example, by shifting gears on a transmission, increasing or decreasing a source of energy gas, pressing or depressing a gas or brake pedal, engaging an anti-lock braking system, and any other vehicle operation. Vehicle safety system 100 uses actuators 107 to implement the vehicle control system of automated road damage detection component 104. Vehicle safety system 100 may activate actuators 107 to change lanes, reduce speed, or both change lanes and reduce speed.

A number of techniques employ vehicle safety system 100 of FIG. 1 to enable automated road damage detection as described herein. In some techniques, the above-mentioned components of vehicle safety system 100 communicate with each other in order to provide automated road damage detection for a vehicle currently in operation. When the vehicle travels on a road, automated road damage detection component 104 may invoke machine learning construct 103 for input data (e.g., streamed data) from various sources including camera unit 101 and LiDAR sensor 102. As described herein, machine learning construct 103 may identify and classify a region on that road as a particular form of road damage. Automated road damage detection component 104, in turn, determines a location of the region in three-dimensional space and performs some action with HMI 105, cloud 106, and/or actuators 107. In some examples, automated road damage detection component 104 stores a location and a reflective index for each reflective point in the three-dimensional space. In some examples, that location may be geographic coordinates such as Global Positioning System (GPS) coordinates. In some examples, automated road damage detection component 104 outputs one or more indications of the identified regions of road damage. As described herein, automated road damage detection component 104 annotates output data (e.g., image data, point cloud data, video data, and/or the like) with indicia of road damage classification(s). The output data may be an image of the road damage as captured by camera unit 101 and rendered for display on a display device. In some examples, automated road damage detection component 104 superimposes, on the image displayed via HMI 105, an indication of a corresponding road damage classification for the identified regions of road damage. In some examples, automated road damage detection component 104 outputs commands instructing actuators 107 and other vehicle controls to cause the vehicle to change lanes, reduce speed, or both change lanes and reduce speed.

In FIG. 1B, structures corresponding to functional elements depicted in FIG. 1B are described. In particular, FIG. 1 shows structural elements of example system 100 of FIG. 1A in more detail. Again, in some examples, example system 100 may be part of a vehicle or an automobile. However, in other examples, example system 100 may be a stand-alone system or may be integrated into other devices for use in other applications which may benefit from shape/orientation estimation.

In one example, example system 100 is a computing device that includes microprocessor 122 in communication with memory 124. In some examples, computing system 100 may include multiple microprocessors. Microprocessor 122 may be implemented as fixed-function processing circuits, programmable processing circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

In the example of FIG. 1B, microprocessor 122 may be configured to execute one or more sets of instructions in LiDAR-based estimation module 128 to perform shape/orientation estimation in accordance with the techniques of this disclosure. The instructions that define LiDAR-based estimation module 128 may be stored in memory 124. In some examples, the instructions that define LiDAR-based estimation module 128 may be downloaded to the memory 124 over a wired or wireless network.

In some examples, memory 124 may be a temporary memory, meaning that a primary purpose of memory 124 is not long-term storage. Memory 124 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Memory 124 may include one or more non-transitory computer-readable storage mediums. Memory 124 may be configured to store larger amounts of information than typically stored by volatile memory. Memory 124 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Memory 124 may store program instructions (e.g., LiDAR-based estimation module 128) and/or information (e.g., point cloud 130 and shape/orientation and location of detected road damage) that, when executed, cause microprocessor 122 to perform the techniques of this disclosure.

The following techniques of the disclosure will be described with reference to microprocessor 122 executing various software modules. However, it should be understood that each of the software modules described herein may also be implemented in dedicated hardware, firmware, software, or any combination of hardware, software, and firmware.

LiDAR-based estimation module 128 may share certain operations with a pre-processing unit 142, a deep neural network (DNN) in machine learning (ML) construct 143, and a post-processing unit 146. LiDAR-based estimation module 128 is configured to receive point cloud 130 from a LiDAR sensor (e.g., LiDAR sensor 10 of FIG. 1). Pre-processing unit 142 is configured to make the unstructured raw input (i.e., point cloud 130 and image data 132) into structuralized frame (e.g., matrix data or vector data), so machine learning unit 144 can process the input data.

Pre-processing unit 142 may be configured to process point cloud data 130 into a structuralized frame in many ways. In one example, pre-processing 142 may be configured to convert an image into pixels and a point cloud into voxels (volume pixels). Pre-processing unit 142 may be configured to perform such pixelization and voxelization according to a pre-defined data structure for the pixels and the voxels, respectively. For example, each of the voxels may be defined by a size of a three-dimensional (3D) bin (e.g., in terms of X, Y, and Z coordinates), as well as the type of data stored for a 3D bin. For example, each 3D bin (i.e., voxel) may include data indicating the number of points from point cloud 130 located in the bin, the location of the points from point cloud 130 in the bin, as well as the intensity of such points. Other examples of data that may be stored in the voxels include mean and variance of height, width, length (x, y, z coordinates), mean and variance of intensity/reflectivity, and other statistics of the point cloud within or even neighboring the voxel. In some examples, a voxel may include zero points from point cloud 130, one point from point cloud data 130, or multiple points from point cloud data 130. Using pre-defined bins may be referred to as manual voxelization. In other examples, pre-processing unit 142 may be configured to voxelize point cloud 130 in an adaptive manner, e.g., by using a neural network that takes raw point cloud 130 as input and outputs a structured (voxelized) frame.

Machine learning unit 144 receives data for machine learning construct Machine learning unit 144 receives the voxelized frame from pre-processing unit 142. A deep neural network is a type of machine learning algorithm. Machine learning unit 144 may be configured with multiple layers of processing layers, each layer configured for determining and/or extracting features from the input data (in this case the voxelized frame of point cloud 130). Each successive layer of machine learning unit 144 may be configured to use the output from the previous layer as input.

In some examples, machine learning unit 144 may configured as a convolutional deep neural network. A convolutional deep neural network is a type of deep, feed-forward neural network. Each layer of a convolutional deep neural network may be referred to as a convolutional layer. Convolutional layers apply a convolution operation to the input (e.g., a voxel of the voxelized frame), passing the result to the next layer. Machine learning unit 144 may be configured with both 3D and 2D convolutional layers. The 3D convolutional layers provide for a more accurate feature extraction (e.g., more accurate identification and classification of road damage and corresponding locations), while the 2D convolutional layers provide for a faster feature extraction, as compared to the 3D convolutional layers. Machine learning unit 144 may be configured to first process the voxelized frame with one or more 3D convolutional layers, and then continue to process the voxelized frame with one or more 2D convolutional layers. The 2D convolutional layers may be configured to only process data from the voxelized frame in the X and Y direction (i.e., not in the Z direction). The number of 3D and 2D convolutional layers, and the division point between the layers determines the tradeoff between speed and accuracy of the shape/orientation estimation. By using a combination of 3D and 2D convolutional layers in machine learning unit 144, road damage detection and location estimation may be performed with a desirable level of accuracy while also maintaining the speed useful for autonomous driving applications.

Machine learning unit 144 is configured to analyze the voxelized frame (or pixelized frame) and produce two outputs for each of the voxels (or pixels). One output may be called a classification. The classification indicates whether or not road damage is present in the voxel and/or the pixel being analyzed. The other output may be called a shape/orientation estimation that is produced from a regression. The regression determines the shape/orientation of the road damage (or a key point of a road damage) if such a road damage is present in the voxel or the pixel. As will be explained in more detail below, machine learning unit 144 may be configured to perform the classification and regression techniques in serial or in parallel.

Machine learning construct 103 may include a two-network infrastructure configured to process each pixel through a first (deep) neural network and each voxel through a second (deep) neural network. Each neural network (NN) model defines the number of 3D and 2D convolutional layers as well as the function performed for each layer. NN model of the second neural network may be trained with a large number of data-label pairs. In the data label-pair, the data for the first neural network is the pixelized image data and the data for the second neural network is the voxelized point cloud data, while the label is possible road damage. NN model is trained by manually annotating (e.g., labeling) point cloud data, and then training the second neural network with the labeled data. The output of the second neural network is compared to the expected output given the labeled data. Technicians may then adjust NN model to find an optimal configuration of the layers and a set of weights for the layers of the first or the second neural network so that given a pre-annotated point cloud, the desired label is predicted when processed by the first or the second neural network. NN model may be predefined and may be periodically updated.

Machine learning unit 144 may be configured to produce a classification and regression results for each anchor position. In one example, a deep neural network may be configured to consider the center of a voxel as an anchor position. For each anchor position, the deep neural network may be configured to compare the data stored in the voxel to one or more predefined anchor configurations (also called a standard or canonical configuration). The anchor configuration may be defined by a plurality of key points.

Post-processing unit 146 may be configured to turn the output of machine learning unit 144 into final output. For example, post-processing unit 146 may be configured to perform non-maximum suppression on the classified and estimated shape(s)/orientation(s) of one or more regions of interest (ROI) that may be produced by machine learning unit 144, resulting in a final location and/or shape/orientation of the road damage detected. Non-maximum suppression is an edge thinning technique. In some cases, machine learning unit 144 will classify persons and estimate shape(s)/orientation(s) for many closely spaced groups of voxels where only one person actually exists. That is, in some circumstances, deep neural network will detect overlapping duplicates of the same road damage. Post-processing unit 146 may use non-maximum suppression techniques to remove duplicate configurations. Post-processing unit 146 outputs the shape/orientation and location of the detected road damage. Shape/orientation and location of the detected road damage may include the location of road damage detected by automated road damage detection component 104 (e.g., in terms of GPS coordinates) as well as a shape/orientation of a configuration defining the road damage (e.g., the location of the key points). The shape/orientation and location of the detected road damage may be stored in memory 124, sent to autonomous driving application 152, other applications 154, user interface 156, or transmitted from example system 100 to another computing system.

In one example, autonomous driving application 152 may be configured to receive shape/orientation and location of detected road damage and make autonomous driving decisions. Other applications 154 represent various other contexts in which shape/orientation and location of detected road damage data may be used in other contexts. For example, the shapes/orientations and locations output by automated road damage detection component 104 may be used in various applications for body language recognition, motion understanding (e.g., traffic, police officers, emergency services personnel, or other personnel signaling/directing traffic), attention and intention detection (e.g., pedestrians waiting/crossing streets), movies, animation, gaming, robotics, human-computer interaction, machine learning, virtual reality, alternative reality, surveillance, abnormal behavior detection, and public security.

In some examples, automated road damage detection component 104 analyzes an image from image data 132 captured by the one or more cameras of camera unit 101 to identify predicted regions of road damage. In some examples, automated road damage detection component 104 correlates point cloud data 130 from LiDAR sensor 102 with the predicted regions of road damage, analyzes the LiDAR sensor data correlated with the predicted regions of road damage to identify regions of road damage in three-dimensional space; and outputs one or more indications of the identified regions of road damage via user interface 156. In some examples, automated road damage detection component 104 identifies the predicted regions of road damage using a machine learning model that is trained using images having annotated regions of road damage. The machine learning model may be at least one of a deep-learning structure or a feature-based classifier.

In some examples, automated road damage detection component 104 applies a first model of machine learning construct 103 to two-dimensional image data to identify the predicted regions of road damage and then, correlates the predicted regions of road damage with three-dimensional points on the three-dimensional point cloud data to produce correlated three-dimensional point cloud data. In some examples, automated road damage detection component 104 applies a second model of machine learning construct 103 to the correlated three-dimensional point cloud data to identify the regions of road damage in three-dimensional space. In some examples, the first model and/or the second model are each deep-learning structures such as a deep neural network, a deep belief network, a recurrent neural network, or a convolutional neural network. In some examples, the first model and/or the second model are each feature-based classifiers such as a probabilistic classifier (e.g., a Bayesian classifier).

In some examples, automated road damage detection component 104 applies an encoder of a first CNN of machine learning construct 103 to two-dimensional image data 132 to produce two-dimensional feature maps comprising structural feature maps and textural feature maps. In some examples, automated road damage detection component 104 applies a decoder of the first CNN to the two-dimensional feature maps to produce a segmented map in which predicted regions of road damage are segmented and identified. In some examples, automated road damage detection component 104 correlates the predicted regions of road damage on the segmentation map with three-dimensional points on three-dimensional point cloud data 130 to produce correlated three-dimensional point cloud data. In some examples, automated road damage detection component 104 applies a second CNN of machine learning construct 103 to the correlated three-dimensional point cloud data to determine whether one or more regions in three-dimensional space correspond to at least one road damage classification.

Figure 2:
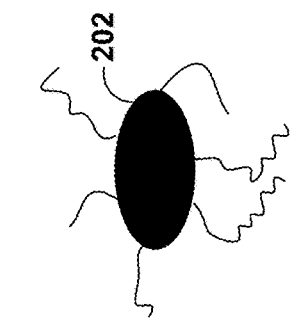
FIG. 2 is an illustration of automated road damage detection by a vehicle safety system, in accordance with the examples described in this disclosure.
Figure 2:
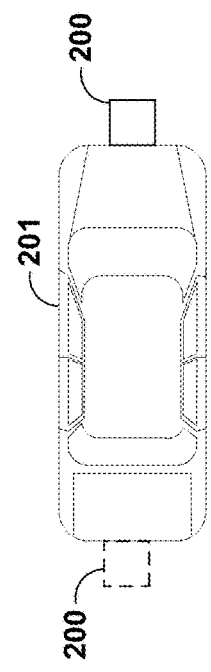

FIG. 2 is an illustration of automated road damage detection by vehicle safety system 200, in accordance with the examples described in this disclosure. Vehicle safety system 200 of FIG. 2 may be same or similar to vehicle safety system 100 of FIG. 1. As illustrated, vehicle safety system 200 is coupled to vehicle 201 and configured to predict upcoming road damage such as pothole 202.

In general, vehicle safety system 200 operates in real-time to provide automated road damage detection to prevent vehicle damage and/or injury to vehicle passengers. Vehicle safety system 200 includes components combining hardware and software to implement a machine learning construct as described herein. In some examples, the machine learning construct is applied to captured data describing a portion of upcoming road including image data and a portion of point cloud data. Vehicle safety system 200 determines whether that portion of upcoming road exhibits road damage. To illustrate by way of example, vehicle safety system 200 is capable of detecting potholes and other classifications of road damage on vehicle 201's path with sufficient time for dampening effect on suspension system and avoiding upcoming road damage. Vehicle safety system 200 may be installed into or outside of vehicle 201 and connected to a network service (e.g., cloud 106 of FIG. 1).

As described herein, vehicle safety system 200 identifies regions having some form of road damage as well as their locations in three-dimensional space and then, performs an action with some mechanism or device in vehicle 201 and/or the network service. Vehicle safety system 200 may store various data points in a road damage region's corresponding position (e.g., a pixel location or a voxel location) in a two-dimensional map (e.g., image data) or three-dimensional map (e.g., three-dimensional point cloud data) depicting an environment surrounding the road damage. One example data point is a road damage classification (e.g., a pothole). Some data points may be location information including geographic coordinates such as Global Positioning System (GPS) coordinates. Additional data points stored for each location may include a reflective index for each reflective point in the three-dimensional space.

By identifying locations of road damage and then, outputting some indicia (or indicators) of those locations, vehicle safety system 200 may adequately alert the vehicle's driver and/or nearby vehicle drivers connected to the network service. For example, vehicle safety system 200 may display a warning message on a display device and/or communicate the above-mentioned locations of road damage to the network service. For some autonomous or near-autonomous vehicles, the automated system may control the car to mitigate the damaging effects from road damage or avoid the locations of road damage altogether. In some examples, vehicle safety system 200 produces commands instructing actuators and other vehicle controls to cause the vehicle to change lanes, reduce speed, or both change lanes and reduce speed.

In some examples, vehicle safety system 200 outputs to the display device one or more indications of identified regions of road damage in the above-mentioned map. As described herein, vehicle safety system 200 annotates output data (e.g., image data, point cloud data, video data, and/or the like) with visual indicia of the identified regions' road damage classifications. The output data may be an image of the road damage as captured by a camera unit and rendered for display on the display device. In some examples, vehicle safety system 200 superimposes, on the image displayed via the display device, an indication of a corresponding road damage classification for the identified regions of road damage.

Figure 3:
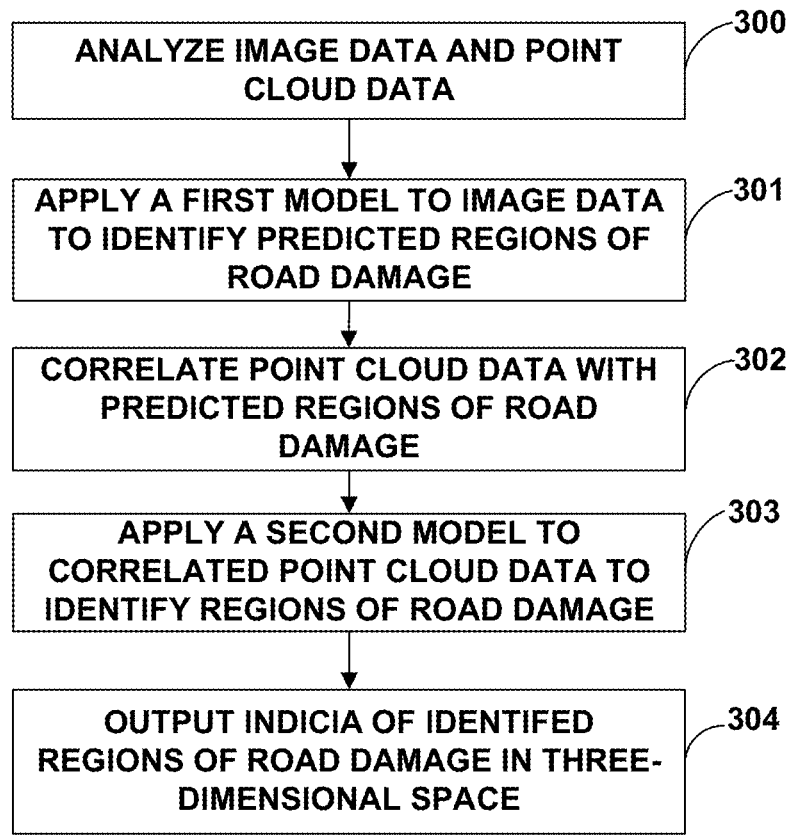
FIG. 3 is a flowchart illustrating an example technique for automated road damage detection technique, in accordance with the examples described in this disclosure.

FIG. 3 is a flowchart illustrating an example technique for automated road damage detection, in accordance with the examples described in this disclosure. The example technique is described with respect to vehicle safety system 100 of FIG. 1.

Automated road damage detection component 104 invokes machine learning construct 103 to analyze image data and point cloud data (300). The image data may be provided by a camera unit such as camera unit 101 of FIG. 1 and the point cloud data may be provided by one or more sensors such as LiDAR sensor 102 of FIG. 1. Automated road detection component 104 applies a first model to the image data do identify predicted regions of road damage (301). The identified predicted regions of road damage include two dimensional pixel data comprising a portion of the image data from the camera unit. As described herein, the first model may be trained using a number of training images and at least one parameter for evaluating the model, for example, a high target recall. The first model may define recall as a fraction of the total number of pixels corresponding to true regions of road damage in the training images and correctly classified by the first model as pixels corresponding to regions of road damage. In this manner, when applied to the two dimensional pixel data of the identify predicted regions of road damage, the first model overestimates a probability of road damage.

As described herein, automated road damage detection component 104 may employ for machine learning construct 103 a two-network infrastructure wherein a first network generates features maps including structural feature maps and textural feature maps. For each feature map, the first network analyzes the image data and identifies a portion of two dimensional pixel data corresponding to a specific feature (e.g., a structural feature or a textural feature) of a plurality of features or feature types. Each feature map is a two-dimensional data set where each 2d point is a value indicating whether that 2D point belongs to the feature map's corresponding feature. Machine learning construct 103 may define feature data for identifying an example feature in two-dimensional image space in a number of ways, such as by a data set (e.g., a vector or a tuple) of attributes characterizing the image data. Example feature data may specify values or value ranges for various parameters including image data parameters, such as color (e.g., intensities) and light (e.g., reflectance, shade, and/or the like) parameters, and other (user-defined) parameters.

In the example of a pothole as upcoming road damage, an encoder of the first network processes an image and determines locations of features such as apertures, road unevenness, individual cracks, asphalt pieces, and/or the like. A decoder of the first network processes these feature maps and identifies predicted regions of road damage. A feature map may show 50 small cracks in a specific area while another feature map identifies holes or areas missing asphalt. The decoder of the first network determines whether a 2D region with 50 small cracks and a big hole in the center is a pothole. Instead of these features, as an alternative, the first network may process regions of an image and compute a mathematical function using an image region's (pixel) values. The results of the mathematical function determine whether an image region is or is not a predicted region of road damage. The second network of the two-network infrastructure confirms or rejects the predicted regions identified by the first network by analyzing these regions in three-dimensional space.

Automated road damage detection component 104 correlates the point cloud data with the identified predicted regions of road damage in the image data (302). Accordingly, the techniques described herein leverage the first model to narrow the road damage search. Generating the correlated point cloud data enables automated road damage detection component 104 to focus a second model on the identified predicted regions of road damage instead of all the point cloud data, which is three-dimensional and a considerable amount of data. Leveraging the first model to identify the predicted regions of road damage conserves resources, reduces resource footprints, and improves upon overall processing time.

Automated road damage detection component 104 applies the second model to the correlated point cloud data to identify regions of road damage in three-dimensional space (303). The identified regions of road damage are actual instances of road damage in three-dimensional space and thus, include three dimensional point cloud data. The second model operates with the first model to form a two-network machine learning infrastructure. The first model is trained to identify road damage features in two-dimensional image data while the second model is trained to identify (same or similar) road damage features in three dimensional point cloud data, specifically the correlated point cloud data. By narrowing the search for road damage to the correlated point cloud data, the techniques may require smaller resource capacities for the second model application. Machine learning construct 103 may define example feature data for the second model attributes of which some attributes may be statistical quantities characterizing the point cloud data. Example feature data may include a mean and a standard deviation of points in the point cloud data where each point may be expressed in three-dimensional space. Example feature data may further include additional parameters characterizing the point cloud data. An example feature may be defined as a data set of specific feature data values.

The techniques described herein also enable sufficient warning time for the vehicle driver and/or a vehicle control system to avoid or mitigate the upcoming road damage. Automated road damage detection component 104 outputs indicia of identified regions of road damage in three dimensional space (304). The techniques described herein may manifest the outputted indicia as a warning message for display on a display device in the vehicle to alert the vehicle's driver as to upcoming road damage.

Figure 4A:
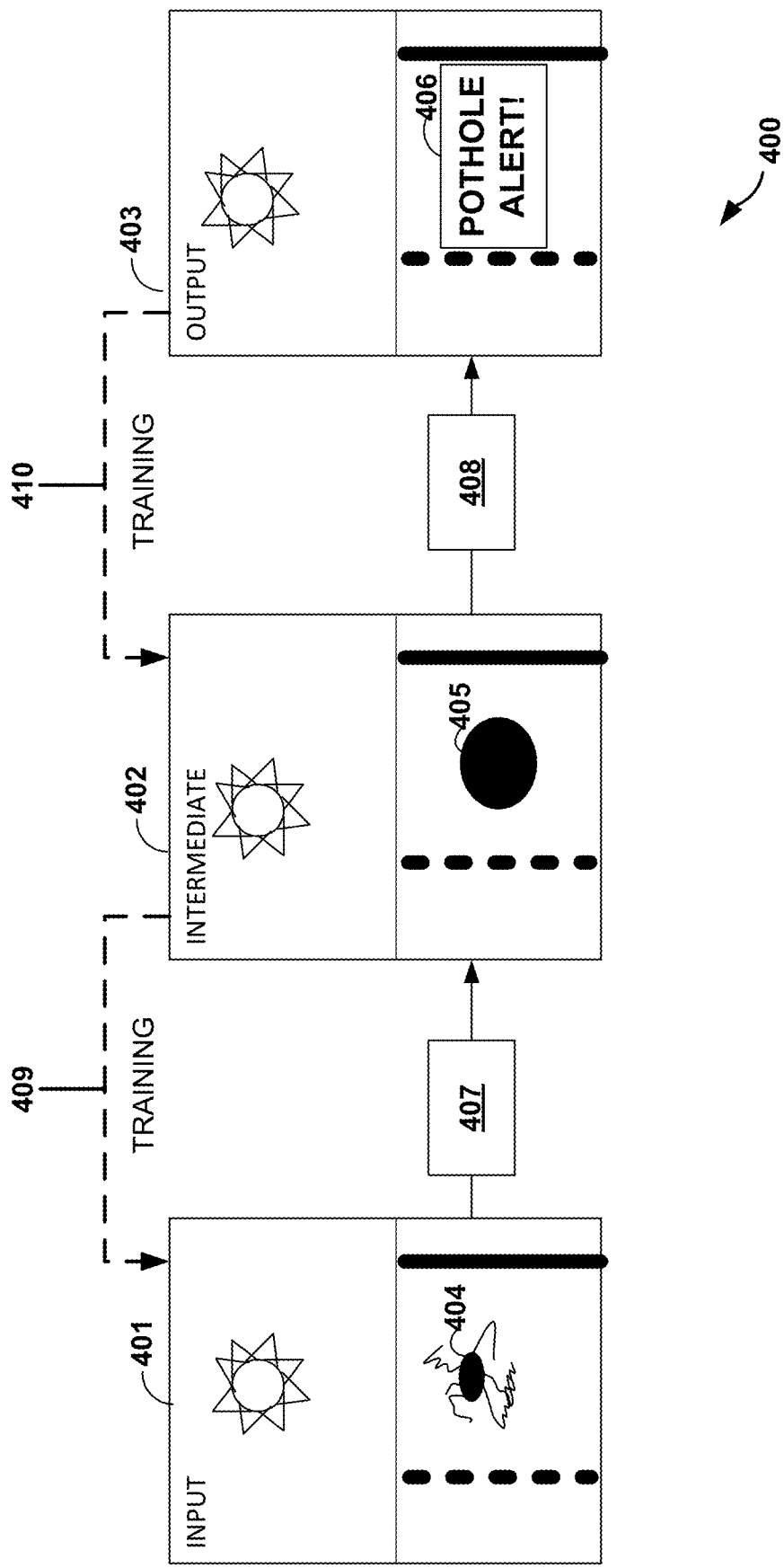
FIG. 4A is a conceptual diagram of an example process for automated road damage detection, in accordance with the examples described in this disclosure.

FIG. 4A is a conceptual diagram of automated road damage detection, in accordance with the examples described in this disclosure. As depicted in FIG. 4A, automated road damage detection can be represented as process 400 involving at least three images or maps: input 401, intermediate 402, and output 403. One or more steps or stages of process 400 may be executed by a vehicle safety system (e.g., vehicle safety system 200 of FIG. 2) installed on a vehicle (e.g., vehicle 201 of FIG. 2). In the example of FIG. 4A, input 401 stores two-dimensional pixel data illustrating a scene where a road has some form of road damage 404 and process 400 applies a machine learning construct to detect that road damage 404 based upon the two-dimensional pixel data.

In the example of FIG. 4A, process 400 invokes automated road damage detection when input 401 is received (e.g., from a camera unit) and then, processed using a machine learning construct. Process 400 applies the machine learning construct to predict a likelihood that input 401 includes an image depicting upcoming road damage. In the example of FIG. 4A, the machine learning construct includes network 407 and network 408 in a two-network infrastructure. Process 400 applies network 407 as a first pass on input 401 to predict a likelihood that the two-dimensional pixel data depicts road damage. That likelihood may correspond to an entirety of input 401 or of an image region of input 401. Network 407 is not configured to have a high precision rate with few false positives for such a configuration incurs costs resulting from potentially misclassifying a large number of true positives as false negatives; instead, network 407 is configured to identify images or image regions that are likely to depict road damage-free roads and eliminate those from further processing. Network 407 may result in a high false positive rate and a low false negative rate. In the example of FIG. 4A, applying network 408 produces intermediate 402 as a segmented image or a map identifying a predicted region 405 of road damage. As illustrated, predicted region 405 of intermediate 402 is a segmented region superimposed over road damage 404. Other regions of intermediate 402 may be segmented in other examples.

Process 400 applies network 408 as a second pass on input 401 by correlating the predicted region 405 of road damage with point cloud data for the same scene, identifying a correlated portion of the point cloud data, and rendering a prediction as to whether the correlated portion of the point cloud data includes road damage 404. Because network 408 is applied to the correlated portion of the point cloud data, only a fraction of the three-dimensional point cloud data is to be processed reducing resource consumption significantly. Network 408 is configured to determine whether the correlated portion of the point cloud data includes a sufficient quantity and arrangement of component features to be classified as at least one road damage classification. In the example of FIG. 4A, road damage 404 is depicted to be a pothole; therefore, network 408 determined that the correlated portion of the point cloud data includes a sufficient number of pothole features and it would be very unlikely for those features to be present without a pothole.

Upon identifying road damage 404 in predicted region 405, process 400 generates output 403 for presentation on a display device. In the example of FIG. 4A, output 403 is an image similar to input 401 except for warning message 406 alerting a driver of the upcoming pothole. Warning message may be superimposed over a location of the upcoming pothole in road damage 404.

Process 400 includes training 409, 410 for network 407 and/or network 408, respectively. Training, as referred to herein, generally refers to training machine learning models to accurately predict some quantity or quality, for example, by adjusting an estimation technique (e.g., mathematical function or probability distribution). In some examples, network 407 undergoes training 409 on a number of input 401 (images), which when compared to normal training with sufficient training data, results in a decrease in resources consumed and time elapsed for deployment of network 407 into a live production environment. In addition, training 409 with minimal training data may result in network 407 overestimating predicted regions of road damage with a substantial false positive rate; having a higher false positive rate may be beneficial when, for example, network 408 correctly confirms or rejects false positive the overestimated predicted regions of road damage identified by network 407. Training 410 of network 408 may employ a sufficient amount of point cloud training data.

In some examples, process 400 trains both network 407 and network 408 together (e.g., sequentially). In one example of such training, process 400 applies network 407 to a set of manually annotated training images to identify predicted regions of road damage and compares the predicted regions of road damage to corresponding annotations. After evaluating that comparison to fit the network 408 to the training images, process 400 correlates those predicted regions with three-dimensional point clouds corresponding to (e.g., overlapping) the manually annotated training images, resulting in correlated point clouds of manually annotated training data for network 408. As an alternative, process 400 correlates annotated regions with three-dimensional point clouds. Then, process 400 applies network 408 to those correlated point clouds to determine whether the predicted regions are depicting actual instances of road damage. In a similar manner, process 400 evaluates results from that determination to adjust network 408 and better identify actual instances of road damage. The correlated point clouds may include LiDAR data from LiDAR sensor(s).

Figure 4B:
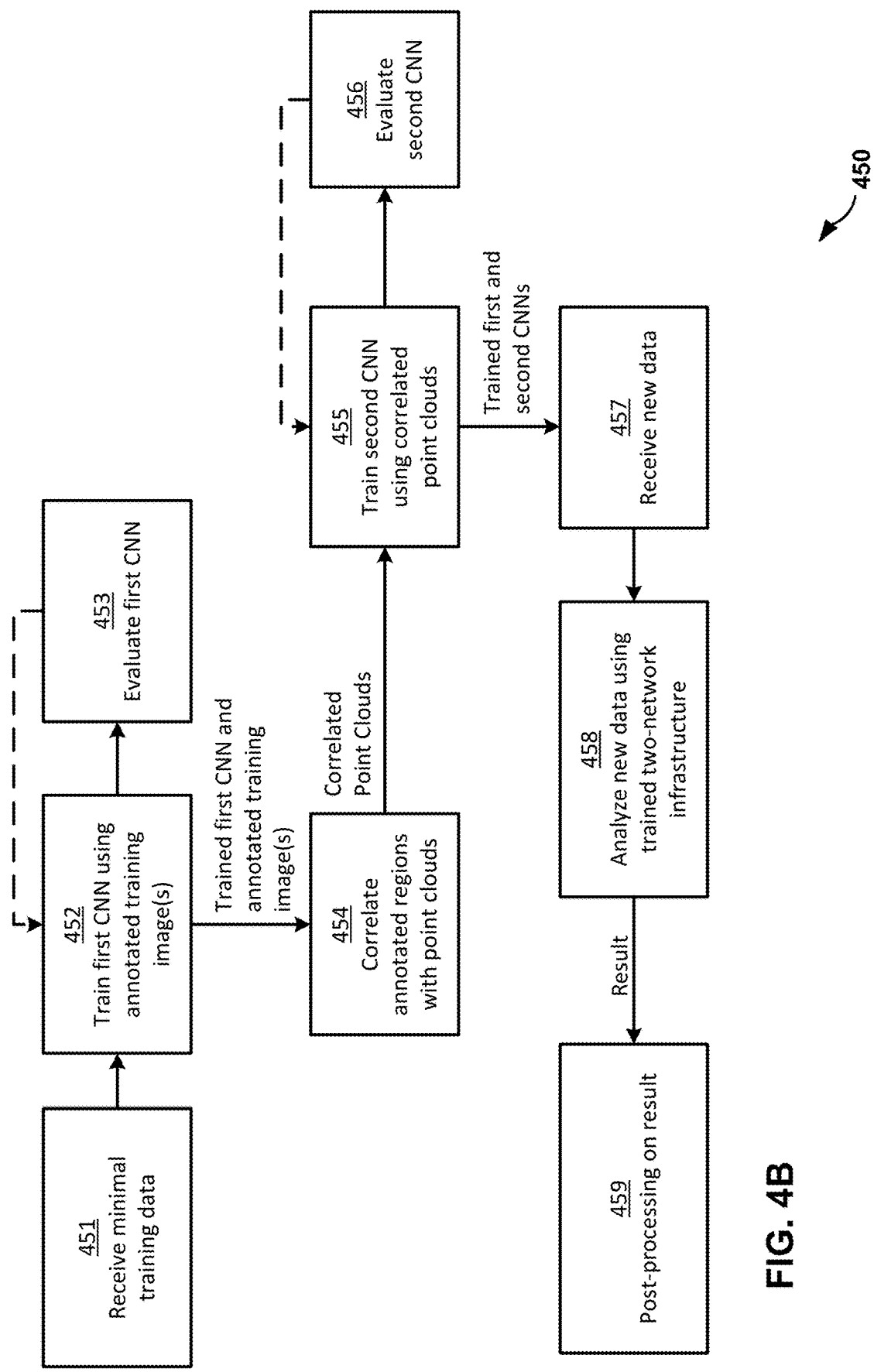
FIG. 4B is a flow diagram of the example process of FIG. 4A with training, in accordance with the examples described in this disclosure.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of process 450 for training and using a two-network infrastructure comprised of network 407 and network 408 is described below with respect to the flow diagram of FIG. 4B. Network 407 and network 408 in the example described in FIG. 4B include a first CNN and a second CNN of the two-network infrastructure.

In block 451, training data is received. In some examples, the training data is received from a remote database or a local database, constructed from various subsets of data, or input by a user. The training data can be used in its raw form for training a first CNN or pre-processed into another form, which can then be used for training the first CNN. For example, the raw form of the training data can be smoothed, truncated, aggregated, clustered, or otherwise manipulated into another form, which can then be used for training the first CNN. In some example, the training data includes training images such as manually annotated training images where actual road damage is identified. The first CNN is deliberately trained to overestimate predicted regions of road damage in any image. In some examples, the training images may be low-quality images for conserving additional processing power.

In block 452, the first CNN is trained using (manually) annotated training images. The first CNN can be trained in a supervised manner. In supervised training, each input in the training data is correlated to a desired output. This desired output may be a scalar, a vector, or a different type of data structure such as text or an image. This may enable the first CNN to learn a mapping between the inputs and desired outputs.

In block 453, the first CNN is evaluated. For example, an evaluation dataset can be obtained, for example, via user input or from a database. The evaluation dataset can include inputs correlated to desired outputs and typically does not include inputs processed by the network during the training process. The inputs can be provided to the first CNN and the outputs from the first CNN can be compared to the desired outputs. If the outputs from the first CNN closely correspond with the desired outputs, the first CNN may have a high degree of accuracy. For example, if 90% or more of the outputs from the first CNN are the same as the desired outputs in the evaluation dataset, the first CNN may have a high degree of accuracy. Otherwise, the first CNN may have a low degree of accuracy. The 90% number is an example only. A realistic and desirable accuracy percentage is dependent on the problem and the data.

In some examples, if the first CNN has an inadequate degree of accuracy for a particular task, the process can return to block 454, where the first CNN can be further trained using additional training data or otherwise modified to improve accuracy. If the machine-learning model has an adequate degree of accuracy for the particular task, the process can continue to block 454.

In block 454, annotated regions of annotated training images are correlated with point clouds corresponding to the annotated training images to produce correlated point clouds. In some examples, these correlated point clouds are used for training the second CNN of the two-network infrastructure. In other examples, the correlated point clouds are predicted regions of road damage correlated with point cloud data.

In block 455, the second CNN is trained using the correlated point clouds as training data. These correlated point clouds include point clouds corresponding to manual annotations of road damage regions in training images or to machine learning predictions of road damage regions in the same training images. The second CNN can be trained in a supervised manner. In supervised training, each input in the training data is correlated to a desired output. This desired output may be a scalar, a vector, or a different type of data structure such as text or an image. This may enable the first CNN to learn a mapping between the inputs and desired outputs.

In block 456, the second CNN is evaluated. For example, an evaluation dataset can be obtained, for example, via user input or from a database. The evaluation dataset can include inputs correlated to desired outputs and typically does not include inputs processed by the network during the training process. The inputs can be provided to the second CNN and the outputs from the second CNN can be compared to the desired outputs. If the outputs from the first CNN closely correspond with the desired outputs, the second CNN may have a high degree of accuracy. For example, if 90% or more of the outputs from the second CNN are the same as the desired outputs in the evaluation dataset, the second CNN may have a high degree of accuracy. Otherwise, the second CNN may have a low degree of accuracy. The 90% number is an example only. A realistic and desirable accuracy percentage is dependent on the problem and the data.

In some examples, if the second CNN has an inadequate degree of accuracy for a particular task, the process can return to block 455, where the second CNN can be further trained using additional training data or otherwise modified to improve accuracy. If the second CNN has an adequate degree of accuracy for the particular task, the process can continue to block 457.

In block 457, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 458, the trained two-network infrastructure comprising the training first CNN and the trained second CNN is used to analyze the new data and provide a result. For example, the new data can be provided as input to the trained two-network infrastructure. The trained two-network infrastructure can analyze the new data and provide a result that includes a classification of the new data into a particular class, a clustering of the new data into a particular group, a prediction based on the new data, or any combination of these.

In block 459, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 5A:
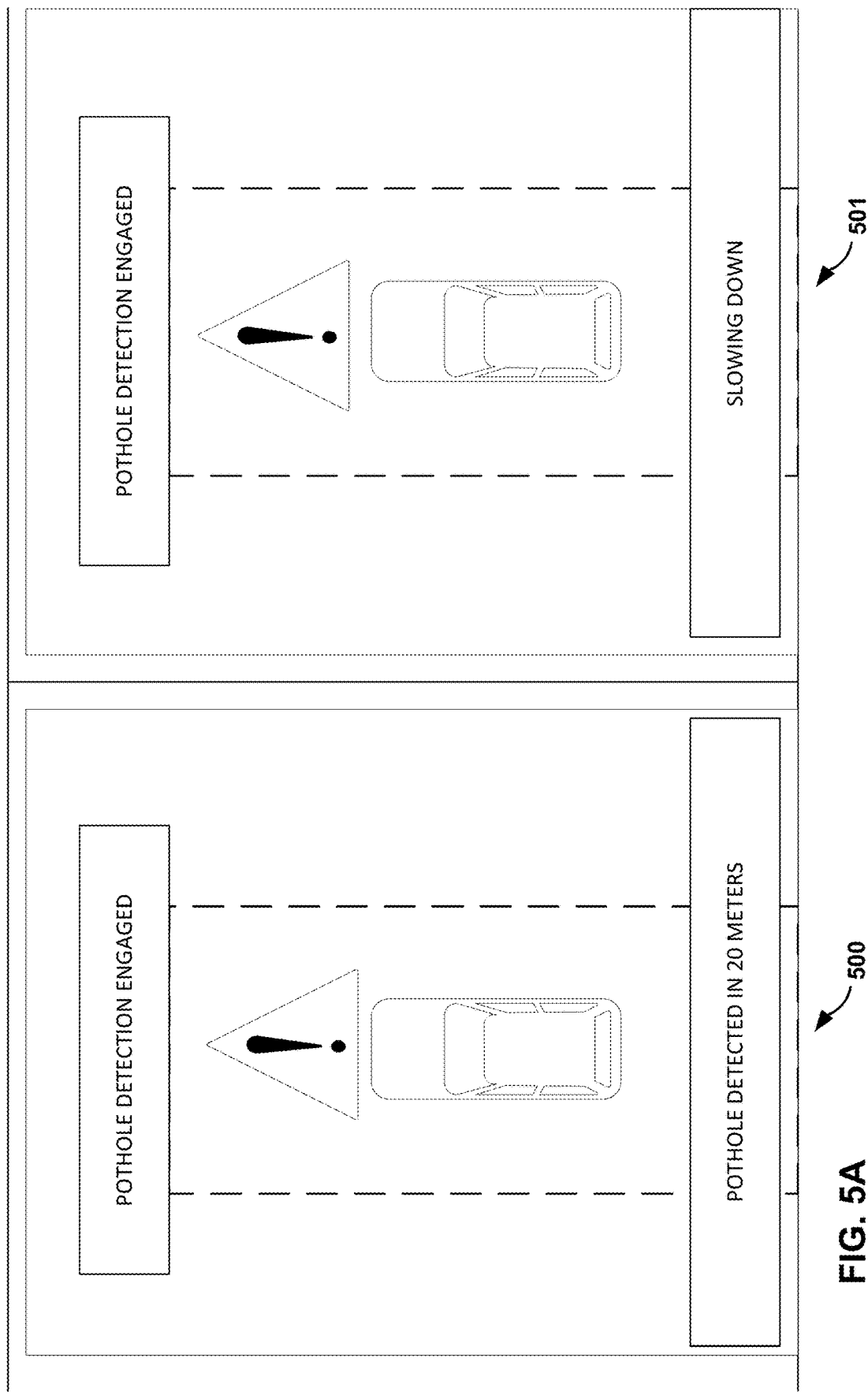
FIGS. 5A-5B illustrate a user interface to a vehicle safety system, in accordance with the examples described in this disclosure.
Figure 5B:
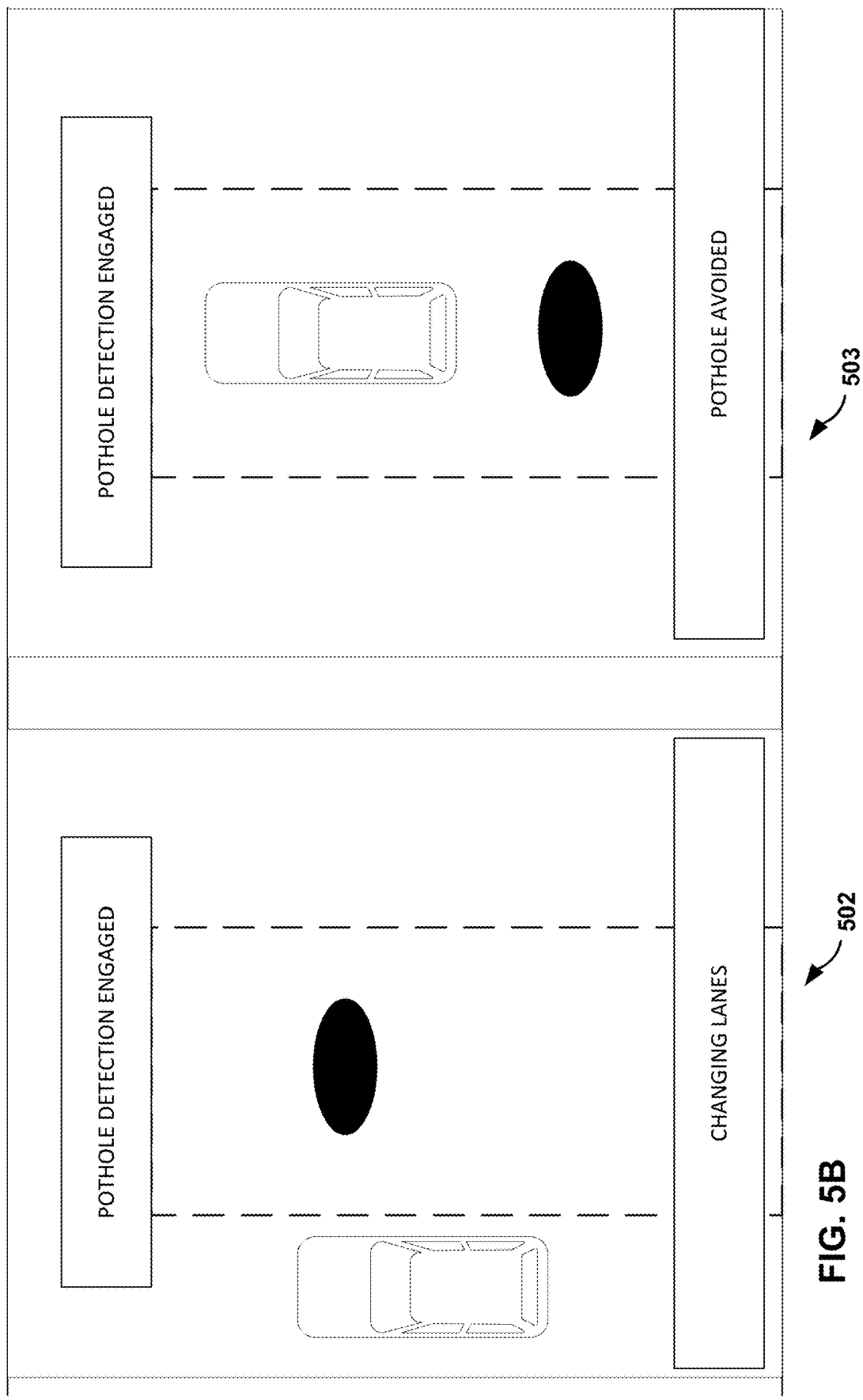

FIGS. 5A-5B illustrate a user interface to a vehicle safety system, in accordance with the examples described in this disclosure. As described herein, the vehicle safety system outputs information for display on a display device presenting the user interface. FIG. 5A illustrates the user interface with first message 500 and second message 501 while FIG. 5B illustrates the user interface with third message 502 and fourth message 503. In FIG. 5A, first message 500 displays an alert symbol indicating road damage ahead of an approaching vehicle and textual data indicating information of the upcoming road damage. First message 500 may display a road damage classification and a distance of the upcoming road damage such as "POTHOLE DETECTED IN 20 METERS" as presented in FIG. 5A. Second message 501 may indicate an automated solution or mitigation for the upcoming road damage. In the example of FIG. 5A, second message 501 indicates that the vehicle is "slowing down" as instructed by automated road damage detection component of the vehicle safety system.

Third message 502 continues to inform the vehicle driver regarding progress of the solution or mitigation. In the example of FIG. 5B, third message 502 includes "CHANGING LANES" to inform the vehicle driver that the automated road damage detection component is instructing vehicle controls to change lanes and avoid the upcoming road damage, which is illustrated as a pothole. When displaying third message 502, the user interface of the vehicle safety system also indicates that the vehicle successfully changed lanes from an original lane to an adjacent free lane. Fourth message 503 displays "POTHOLE AVOIDED" indicating successful evasion of the upcoming road damage to the vehicle driver. When displaying fourth message 503, the user interface of the vehicle safety system also indicates that the vehicle returned to an original lane after changing lanes.

Figure 6:
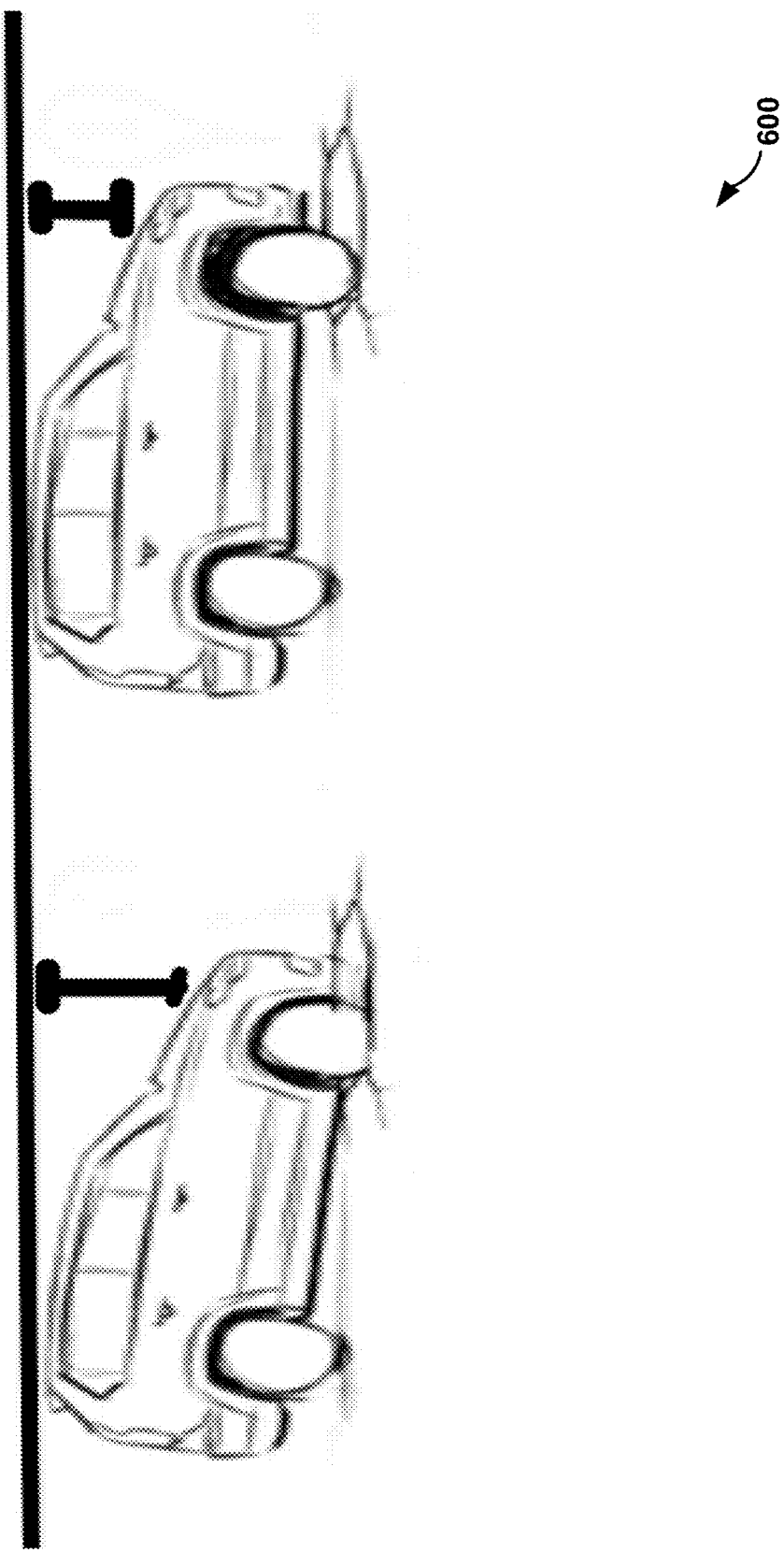
FIG. 6 is an illustration of a vehicle safety system with a road dampening feature, in accordance with the examples described in this disclosure.

FIG. 6 is an illustration of a vehicle safety system with road dampening feature 600, in accordance with the examples described in this disclosure. Road dampening feature 600 is a feature of automated road damage detection component 104 of vehicle safety system 100 of FIG. 1. Vehicles employing road dampening feature 600 apply the feature to mitigate upcoming road damage when avoiding the upcoming road damage becomes impossible or impractical. Due to limitations present in current vehicle safety systems, a vehicle's suspension system cannot dampen the effect of road unevenness let alone a depression such as a pothole. This is partially due to insufficient warning time afforded current vehicle suspension systems.

Road dampening feature 600, as illustrated in FIG. 6, is invoked by the vehicle safety system after detecting the upcoming road damage in the form of a pothole. With sufficient warning time, road damaging feature 600 controls the attached vehicle to limit damage from engaging the pothole. As illustrated, the vehicle is instructed to reduce speed when approaching the upcoming pothole, enabling vehicle suspension system to dampen effected from the engagement of the upcoming pothole. In some examples, automated road damage detection component 104 of vehicle safety system 100 issues a command instructing the vehicle suspension system to reduce speed and a dampen effect from the upcoming pothole.

Various examples have been described. These and other examples are within the scope of the following claims.

The invention claimed is:

1. A method of detecting road damage comprising:
analyzing a two-dimensional image of a path of a vehicle captured by one or more cameras to identify predicted regions of road damage in the two-dimensional image;
correlating point cloud data of the path of the vehicle from at least one LiDAR sensor with the predicted regions of road damage in the two-dimensional image;
analyzing the point cloud data from the at least one LiDAR sensor data correlated with the predicted regions of road damage to identify regions of road damage in three-dimensional space,
wherein analyzing the point cloud data from the at least one LiDAR sensor further comprises applying a model to identify the regions of road damage in the three-dimensional space,
wherein the model processes feature data from the point cloud data, and
wherein the feature data comprises a mean and a standard deviation of points in the point cloud data; and
outputting one or more indications of the identified regions of road damage.

2. The method of claim 1, wherein analyzing the two-dimensional image further comprises identifying the predicted regions of road damage using a machine learning model that is trained using two-dimensional images having annotated regions of road damage, wherein the machine learning model comprises at least one of a deep-learning structure or a feature-based classifier.

3. The method of claim 1, wherein the model comprises a second model, and wherein analyzing the two-dimensional image, correlating the point cloud data from the at least one LiDAR sensor, and analyzing the point cloud data from the at least one LiDAR sensor further comprises:
applying a first model to two-dimensional image data to identify the predicted regions of road damage, wherein the first model comprises a feature-based classifier or a deep-learning structure;
correlating the predicted regions of road damage with three-dimensional points on the three-dimensional point cloud data to produce correlated three-dimensional point cloud data; and
applying the second model to the correlated three-dimensional point cloud data to identify the regions of road damage in the three-dimensional space, wherein the second model comprises a feature-based classifier or a deep-learning structure.

4. The method of claim 3, wherein the deep-learning structure comprises at least one of a deep neural network, a deep belief network, a recurrent neural network, or a convolutional neural network.

5. The method of claim 3, wherein the feature-based classifier comprises a probabilistic classifier, wherein the probabilistic classifier comprises a Bayesian classifier.

6. The method of claim 1, wherein analyzing the two-dimensional image, correlating the point cloud data from the at least one LiDAR sensor, and analyzing the point cloud data from the at least one LiDAR sensor further comprises:
applying an encoder of a first CNN to two-dimensional image data to produce two-dimensional feature maps, wherein the two-dimensional feature maps comprise structural feature maps and textural feature maps;
applying a decoder of the first CNN to the two-dimensional feature maps to produce a segmented map wherein the predicted regions of road damage are segmented and identified; and correlating the predicted regions of road damage on the segmentation map with three-dimensional points on the three-dimensional point cloud data to produce correlated three-dimensional point cloud data;
applying the model, comprising a second CNN, to the correlated three-dimensional point cloud data to determine whether one or more regions in three-dimensional space correspond to at least one road damage classification.

7. The method of claim 6, wherein the first CNN and the second CNN comprise neural networks that are combined to form a two-network infrastructure.

8. The method of claim 6, wherein the second CNN includes a deep-learning structure that is shallower than the first CNN model.

9. The method of claim 1, wherein outputting one or more indications of the identified regions of road damage further comprises superimposing, on the two-dimensional image, an indication of a corresponding road damage classification for the identified regions of road damage.

10. The method of claim 1, wherein correlating the point cloud data comprises identifying one or more voxel locations in the point cloud data of the path of the vehicle that overlap the predicted regions of road damage in the image of the path of the vehicle, the method further comprising storing, in point cloud data for the identified voxel locations that overlap the predicted regions of road damage, a location and a reflective index for each reflective point in the three-dimensional space.

11. The method of claim 1, wherein the identified regions in three-dimensional space are annotated with at least one attribute, wherein the at least one attribute comprises at least one of a road damage classification or a depth range, wherein the depth range comprises at least one of near range, middle range, or far range.

12. The method of claim 1, wherein outputting further comprises communicating, to a network service, location information of the identified regions on a path of a vehicle, wherein the network service populates map data with the location information.

13. The method of claim 1, wherein outputting further comprises instructing a vehicle control system to cause a vehicle to change lanes, reduce speed, or both change lanes and reduce speed.

14. A vehicle safety system communicably coupled to a vehicle, comprising:
processing circuitry coupled to a camera unit and a LiDAR sensor, the processing circuitry to execute logic operative to:
analyze a two-dimensional image of a path of a vehicle captured by one or more cameras to identify predicted regions of road damage in the two-dimensional image;
correlate point cloud data of the path of the vehicle from at least one LiDAR sensor with the predicted regions of road damage in the two-dimensional image;
analyze the point cloud data from the at least one LiDAR sensor correlated with the predicted regions of road damage to identify regions of road damage in three-dimensional space;
output one or more indications of the identified regions of road damage; wherein the processing circuitry is coupled to an interface to the vehicle, the processing circuitry to output an identification of road damage; and
display, via the interface, a warning message on a display device within the vehicle.

15. The vehicle safety system of claim 14, further comprising memory configured to store two-dimensional image datasets captured by the camera unit and three-dimensional point cloud datasets captured by the at least one LiDAR sensor corresponding to a path of the vehicle,
wherein the processing circuitry to execute logic operative to:
apply to the two-dimensional image datasets an encoder of a first convolution neural network (CNN) to produce two-dimensional feature maps;
apply to the two-dimensional feature maps a decoder of the first convolution neural network (CNN) to produce a segmented map wherein one or more predicted regions of road damage are segmented and identified;
correlating the predicted regions of road damage on the segmentation map with three-dimensional points on the three-dimensional point cloud data to produce correlated three-dimensional point cloud data; and
apply a second convolution neural network (CNN), to the correlated three-dimensional point cloud datasets to determine whether one or more regions in three-dimensional space correspond to at least one road damage classification,
wherein the processing circuitry to output an identification of a region corresponding to a road damage classification.

16. The vehicle safety system of claim 14, wherein the processing circuitry to execute logic operative to communicate, via the interface, a command to a vehicle control system, wherein the vehicle control system causes the vehicle to reduce speed or change lanes.

17. The vehicle safety system of claim 14, wherein the processing circuitry to execute logic operative to communicate, via the interface, a command to a vehicle suspension system, wherein the vehicle suspension system causes the vehicle to dampen effect of an upcoming pothole.

18. A method of detecting road damage comprising:
analyzing a two-dimensional image of a path of a vehicle captured by one or more cameras to identify predicted regions of road damage in the two-dimensional image;
correlating point cloud data of the path of the vehicle from at least one LiDAR sensor with the predicted regions of road damage in the two-dimensional image;
analyzing the point cloud data from the at least one LiDAR sensor data correlated with the predicted regions of road damage to identify regions of road damage in three-dimensional space;
outputting one or more indications of the identified regions of road damage; and
displaying, via the interface, a warning message on a display device within the vehicle.

19. The method of claim 18, further comprising communicating a command to a vehicle control system to cause the vehicle to reduce speed or change lanes.

20. The method of claim 18, further comprising communicating a command to a vehicle suspension system to cause the vehicle to dampen an effect of an upcoming pothole.

* * * * *